United States Patent [19]

Inui et al.

[11] Patent Number: 4,869,122

[45] Date of Patent: Sep. 26, 1989

[54] MANUAL TRANSMISSION FOR MOTOR VEHICLE

[75] Inventors: Masaki Inui; Masakazu Ishikawa, both of Toyota, Japan

[73] Assignee: Toyota Jidosha Kabushiki Kaisha, Aichi, Japan

[21] Appl. No.: 234,152

[22] Filed: Aug. 19, 1988

[30] Foreign Application Priority Data

Aug. 21, 1987 [JP] Japan .................. 62-208822

[51] Int. Cl.$^4$ .............................................. F16H 3/08
[52] U.S. Cl. ...................................... 74/331; 74/333; 74/357; 74/359
[58] Field of Search .................. 74/331, 333, 356, 357, 74/359, 665 GA

[56] References Cited

U.S. PATENT DOCUMENTS

| | | | |
|---|---|---|---|
| 1,825,056 | 9/1931 | Drissner | 74/333 |
| 2,511,539 | 6/1950 | Orr | 74/331 |
| 2,694,940 | 11/1954 | Schmitter | 74/359 |
| 2,825,232 | 3/1958 | Sieving et al. | 74/333 X |
| 3,142,195 | 7/1964 | Henyon | 74/359 |
| 3,301,079 | 1/1967 | Fletcher et al. | 74/333 |
| 3,318,167 | 5/1967 | Frast | 74/333 X |
| 3,498,150 | 3/1970 | Funk | 74/359 X |
| 4,294,130 | 10/1981 | Kisaka et al. | 74/665 GA X |
| 4,461,188 | 7/1984 | Fisher | 74/331 X |
| 4,476,737 | 10/1984 | Young | 74/333 X |
| 4,565,106 | 1/1986 | Sumiyoshi | 74/356 X |
| 4,708,026 | 11/1987 | Ikemoto | 74/331 X |
| 4,738,150 | 4/1988 | Miner | 74/359 |
| 4,771,647 | 9/1988 | Stevens | 74/331 |
| 4,776,227 | 10/1988 | Janiszewski | 74/331 |

FOREIGN PATENT DOCUMENTS

| | | | |
|---|---|---|---|
| 12435 | 8/1956 | Fed. Rep. of Germany | 74/331 |
| 990127 | 9/1951 | France | 74/333 |
| 468647 | 3/1971 | Japan . | |
| 58-44551 | 9/1983 | Japan . | |
| 769759 | 3/1957 | United Kingdom | 74/333 |

*Primary Examiner*—Leslie A. Braun
*Assistant Examiner*—Christopher Campbell
*Attorney, Agent, or Firm*—Oliff & Berridge

[57] ABSTRACT

A manual transmission includes an input shaft having first and second drive gears fixed thereon respectively for low speed drive and high speed drive, an output shaft arranged in parallel with the input shaft and having at least a pair of axially spaced change-speed driven gears fixed thereon, a first countershaft arranged in parallel with the input and output shafts at one side thereof and having a first driven gear fixed thereon and in mesh with the first drive gear, a pair of axially spaced low speed drive gears rotatably mounted thereon and in mesh with the change-speed driven gears, and a first synchronizer coupling adapted to selectively connect the low speed drive gears to the first countershaft, and a second countershaft arranged in parallel with the input and output shafts at the other side thereof and having a second driven gear fixed thereon and in mesh with the second drive gear, a pair of axially spaced high speed drive gears rotatably mounted thereon and in mesh with the change-speed driven gears, and a second synchronizer coupling adapted to selectively connect the high speed drive gears to the second countershaft, wherein the input shaft has a reverse drive gear fixed thereon and the output shaft has a reverse driven gear axially slidably mounted thereon to be brought into engagement with the reverse drive gear.

6 Claims, 4 Drawing Sheets

MANUAL TRANSMISSION FOR MOTOR VEHICLE

BACKGROUND OF THE INVENTION

1. Field of the Invention

The present invention relates to a manual transmission for motor vehicles, and more particularly to a variable speed manual transmission of the type which includes four axes upon which the drive elements are mounted.

2. Description of the Prior Art

U.S. Pat. No. 4,458,551 issued on July 10, 1984 discloses a variable speed manual transmission which includes an input shaft having a drive pinion fixed thereon, an output shaft coaxial with the input shaft and having a first synchronizer coupling adapted to selectively connect the input shaft to the output shaft and first, second, third, fourth and fifth pinions, a first intermediate shaft having first and second gears fixed thereon and located on opposite axial ends of the first synchronizer coupling, a second synchronizer coupling mounted thereon and third and fourth gears selectively connectable to the first intermediate shaft by the second synchronizer coupling, and a second intermediate shaft having a fifth gear fixed thereon, a third synchronizer coupling mounted thereon, and sixth and seventh gears selectively connectable to the second intermediate shaft by the third synchronizer coupling. The third, fourth and fifth pinions are continuously engaged with the third, fourth and sixth gears, respectively, the first pinion is continuously engaged with the second gear, and the first and fifth gears are continuously engaged with the drive pinion. In such an arrangement, the axial length of the transmission may not be shortened due to coaxial arrangement of the input and output shafts, and the output shaft is located at the same height as the input shaft. For these reasons, it is difficult to manufacture the manual transmission in a compact construction, and it is also difficult to mount the manual transmission on a desired portion of a motor vehicle.

SUMMARY OF THE INVENTION

It is, therefore, a primary object of the present invention to provide an improved manual transmission the output shaft of which is located under the input shaft and in parallel therewith to shorten the axial length of the transmission and to facilitate the mounting of the transmission on a motor vehicle and the input shaft of which has a reverse drive gear fixed thereon to provide a reverse drive train in a simple construction without a reverse idler gear and an idler shaft for the same.

According to the present invention, the primary object is attained by providing a manual transmission which includes an input shaft having first and second drive gears fixed thereon respectively for low speed drive and high speed drive; an output shaft located under the input shaft and in parallel therewith and having at least a pair of axially spaced change-speed driven gears fixed thereon; a first countershaft arranged in parallel with the input and output shafts at one side thereof and having a first driven gear fixed thereon and continuously engaged with the first drive gear, a pair of axially spaced low speed drive gears rotatably mounted thereon and continuously engaged with the change-speed driven gears, and a first synchronizer coupling provided thereon to selectively connect the low speed drive gears to the first countershaft; and a second countershaft arranged in parallel with the input and output shafts at the other side thereof and having a second driven gear fixed thereon and continuously engaged with the second drive gear, a pair of axially spaced high speed drive gears rotatably mounted thereon and continuously engaged with the change-speed driven gears, and a second synchronizer coupling provided thereon to selectively connect the high speed drive gears to the second countershaft.

In the manual transmission, the input shaft has a reverse drive gear fixed thereon and the output shaft has a reverse driven gear axially slidably mounted thereon to be brought into meshing engagement with the reverse drive gear. Alternatively, the output shaft may be provided with a reverse driven gear rotatable thereon and continuously engaged with the reverse drive gear on the input shaft and provided thereon with a synchronizer coupling to selectively connect the reverse driven gear to the output shaft.

In a practical enbodiment of the present invention, the input and output shafts and the countershafts are rotatably mounted within a transmission housing, the reverse drive gear is fixed on a rear end of the input shaft extending into an extension housing fastened to a rear end of the transmission housing, and the reverse driven gear is axially slidably mounted on a portion of the output shaft extending into the extension housing.

BRIEF DESCRIPTION OF THE DRAWINGS

Other objects, features and advantages of the present invention will be more readily appreciated from the following detailed description of preferred embodiments thereof when considered with reference to the accompanying drawings, in which.

DESCRIPTION OF THE PREFERRED EMBODIMENTS

Figure 1:
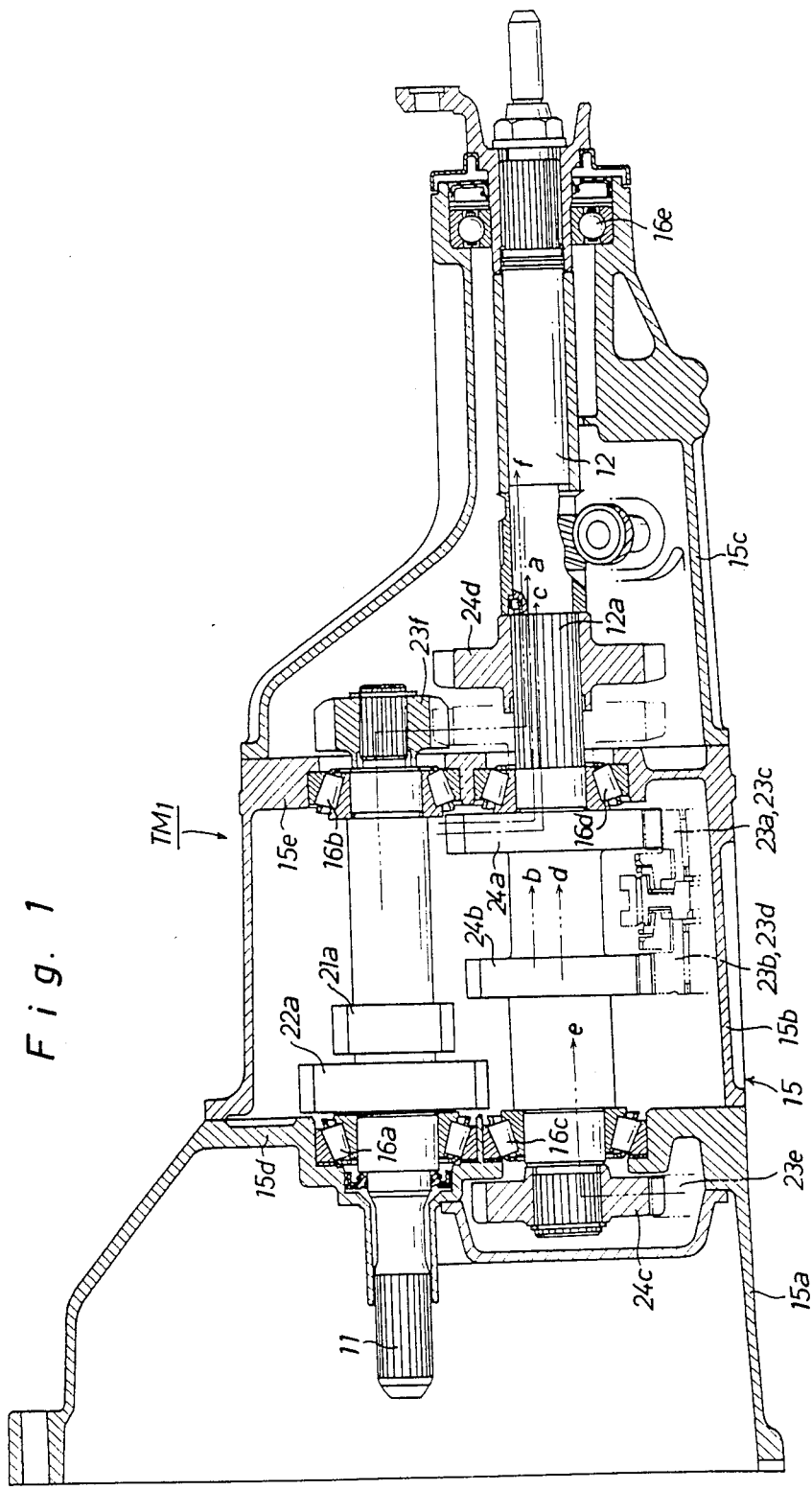
FIG. 1 is a sectioned side view of a variable speed manual transmission according to the present invention, being taken at plane I—I in FIG. 3.
Figure 2:
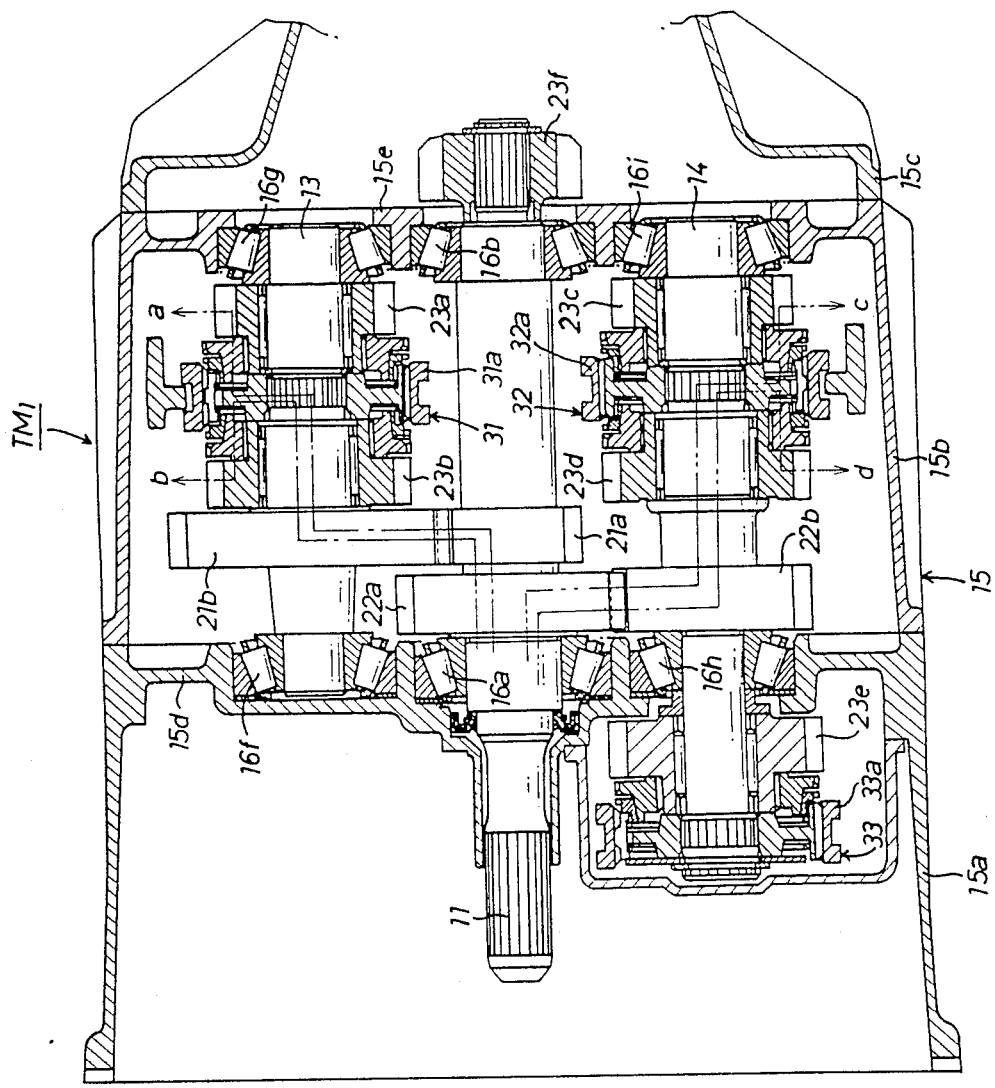
FIG. 2 is a sectioned plan view of the manual transmission taken at plane II—II in FIG. 3.
Figure 3:
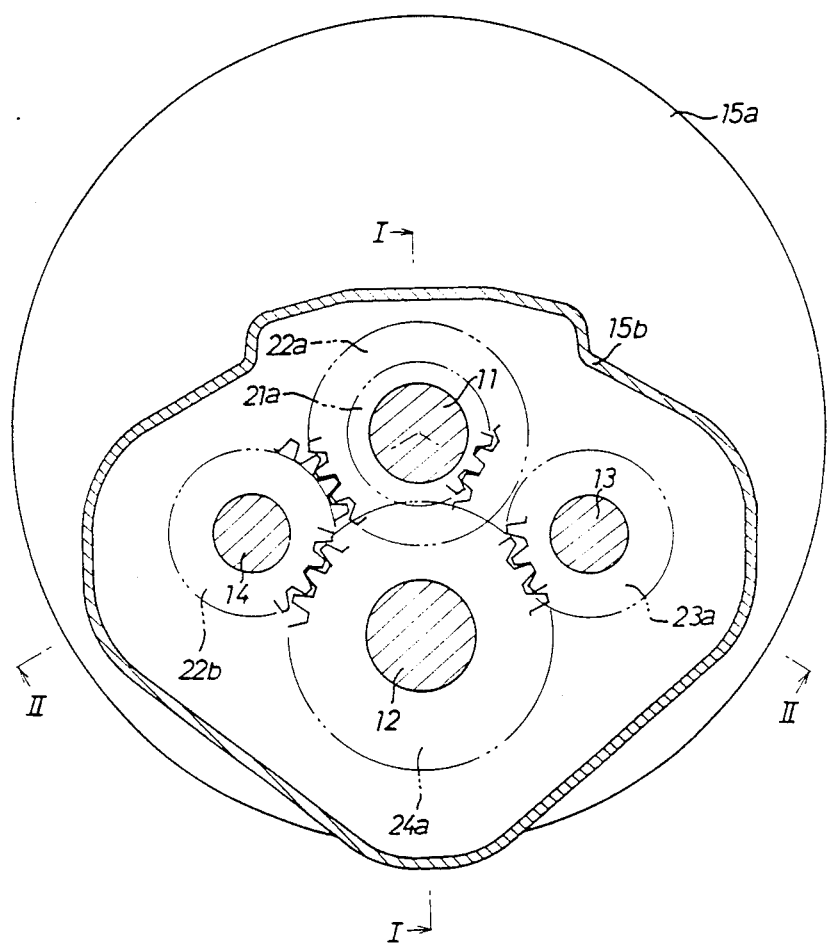
FIG. 3 is a cross-sectional view schematically illustrating an arrangement of four axes in the manual transmission.

As illustrated in FIGS. 1–3 of the drawings, a variable speed manual transmission $TM_1$ according to the present invention has an input shaft 11, an output shaft 12 and two parallel countershafts 13, 14 rotatably mounted within a housing assembly 15 including a clutch housing part 15a, a transmission housing part 15b and an extension housing part 15c fastened together to be mounted as a unit on a motor vehicle of the front-engine rear-wheel drive type. The input shaft 11 is rotatably supported by a pair of axially spaced tapered roller bearing 16a and 16b respectively carried on upright rear end walls 15d and 15e of housing parts 15a and 15b. The input shaft 11 has a rear end extending into the extension housing part 15c. The output shaft 12 is located under the input shaft 11 and in parallel therewith and is rotatably supported by a pair of axially spaced tapered roller bearings 16c and 16d respectively carried on the upright rear end walls 15d and 15e. The output shaft 12 extends outwardly through the extension housing part 15c and is further supported by a ball bearing 16e carried on the rear end of housing part 15c.

As shown in FIG. 2, the countershafts 13 and 14 are arranged in parallel with the input and output shafts 11 and 12 at opposite sides thereof and are each located between the input and output shafts 11 and 12 in a vertical plane. The first countershaft 13 is rotatably supported by a pair of axially spaced tapered roller bearings 16f and 16g carried on the upright rear end walls 15d and 15e of housing parts 15a and 15b. Similarly, the second countershaft 14 is rotatably supported by a pair of axially spaced tapered roller bearings 16h and 16i carried on the upright rear end walls 15d and 15e of housing parts 15a and 15b. The second countershaft 14 has a front end portion extending into the clutch housing part 15a.

The input shaft 11 has a first drive gear 21a of small diameter for low speed drive and a second drive gear 22a of large diameter for high speed drive fixedly mounted thereon. The first drive gear 21a is continuously in meshing engagement with a first driven gear 21b of large diameter integrally provided on the first countershaft 13, while the second drive gear 22a is continuously in meshing engagement with a second driven gear 22b of small diameter integrally provided on the second countershaft 14. The first countershaft 13 has first and second forward drive gears 23a and 23b rotatably mounted thereon and a first synchronizer coupling 31 mounted thereon between the first and second forward drive gears 23a and 23b. When a clutch sleeve 31a of coupling 31 is retained in a neutral position, the first and second forward drive gears 23a and 23b are conditioned to freely rotate on the first countershaft 13. The clutch sleeve 31a of coupling 31 is axially moved rearwards or forwards to selectively connect the first and second forward drive gears 23a and 23b to the first countershaft 13 for rotation therewith.

Similarly, the second countershaft 14 has third and fourth forward drive gears 23c and 23d rotatably mounted thereon and a second synchronizer coupling 32 mounted thereon between the third and fourth forward drive gears 23c and 23d. When a clutch sleeve 32a of coupling 32 is retained in a neutral position, the third and fourth forward drive gears 23c and 23d are conditioned to freely rotate on the second countershaft 14. The clutch sleeve 32a of coupling 32 is axially moved rearwards or forwards to selectively connect the third and fourth forward drive gears 23c and 23d to the second countershaft 14 for rotation therewith. In this embodiment, the second countershaft 14 has a fifth forward drive gear 23e rotatably mounted on the front end portion thereof and located in the clutch housing part 15a and a third synchronizer coupling 33 provided thereon to selectively connect the fifth forward drive gear to the second countershaft 14.

As shown in FIG. 1, the output shaft 12 is integrally provided thereon with a first driven gear 24a of large diameter for the first and third speed ratios and a second driven gear 24b of small diameter for the second and fourth speed ratios. As shown by imaginary lines in the figure, the first driven gear 24a is continuously in meshing engagement with both the first and third forward drive gears 23a and 23c, while the second driven gear 24b is continuously in meshing engagement with both the second and fourth forward drive gears 23b and 23d. The output shaft 12 has a third driven gear 24c for the fifth speed ratio fixed on a front end thereof extending into the clutch housing part 15a and continuously in meshing engagement with the fifth forward drive gear 23e.

In this embodiment, the input shaft 11 has a reverse drive gear 23f fixed on the rear end thereof, and the output shaft 12 has a spline portion 12a on which a reverse driven gear 24d is axially slidably mounted to be brought into meshing engagement with the reverse drive gear 23f. When shifted forwards by means of a shift fork (not shown), the reverse driven gear 24d is directly engaged with the reverse drive gear 23f to provide a reverse drive train. In addition, the input shaft 11 of manual transmission $TM_1$ is arranged to be drivingly connected to a crankshaft of a prime mover of the vehicle through a clutch mechanism (not shown), while the output shaft 12 is arranged to be drivingly connected to a rear propeller shaft (not shown).

In operation, the power applied to input shaft 11 is transmitted to the first countershaft 13 through gears 21a and 21b and to the second countershaft 14 through gears 22a and 22b. When the first synchronizer coupling 31 is moved rearwards to connect the first forward drive gear 32a to the first countershaft 13, the power is transmitted to the output shaft 12 through the first driven gear 24a as shown by a dash and dotted line a in FIGS. 1 and 2. When the first synchronizer coupling 31 is moved forwards to connect the second forward drive gear 32b to the first countershaft 13, the power is transmitted to the output shaft 12 through the second driven gear 24b as shown by a dash and dotted line b in FIGS. 1 and 2. When the second synchronizer coupling 32 is moved rearwards to connect the third forward drive gear 23c to the second countershaft 14, the power is transmitted to the output shaft 12 through the first driven gear 24a as shown by a dash and two-dotted line c in FIGS. 1 and 2. When the second synchronizer coupling 32 is moved forwards to connect the fourth forward drive gear 23d to the second countershaft 14, the power is transmitted to the output shaft 12 through the second driven gear 24b as shown by a dash and two-dotted line d in FIGS. 1 and 2. When the third synchronizer coupling 33 is moved rearwards to connect the fifth drive gear 23e to the second countershaft 14, the power is transmitted to the output shaft 12 through the third driven gear 24c as shown by a dash and three-dotted line e in FIG. 1. When the reverse driven gear 24d is shifted forwards to connect the reverse drive gear 23f, the power is transmitted to the output shaft 12 through gears 23f, 24d as shown by a dash and four-dotted line f in FIG. 1. In such a manner as described above, the power is transmitted to the output shaft 12 selectively at the five forward speed ratios and the reverse drive ratio.

In the manual transmission $TM_1$, it is to be noted that the output shaft 12 is located under the input shaft 11 and in parallel therewith and arranged also in parallel with the countershafts 13 and 14. With such an arrangement of the four shafts, the axial length of the manual transmission $TM_1$ can be shortened to provide the manual transmission in a compact construction. Since the distance between the axially spaced bearings is shortened, thermal influence to each preload of the bearings can be reduced. Furthermore, the rear propeller shaft for connection to the output shaft 12 can be arranged in a lower position than the input shaft 11 to facilitate the mounting of the manual transmission on the vehicle.

The manual transmission $TM_1$ is further characterized in that the reverse drive gear 23f on input shaft 11 is directly engaged with the reverse driven gear 24d on output shaft 12 to establish the reverse drive train. With such an arrangement of the reverse drive and driven gears 23f and 24d a conventional reverse idler gear and a reverse idler shaft for the same can be eliminated. Accordingly a lubrication mechanism for the reverse idler gear and shaft is not needed. This is useful to reduce the number of component parts of the transmission and to reduce gear noises and loss of the power during forward drive of the vehicle. The manual transmission TM$_1$ is also characterized in that the fifth drive gear 23e and third driven gear 24c are located in the clutch housing part 15a and that the reverse drive and driven gears 23f and 24d are located in the extension housing part 15c. With such an arrangement, dead spaces in housing parts 15a and 15c are utilized to contain the gears 23e, 24c, 23f and 24d therein. This is also useful to shorten the axial length of the transmission.

Figure 4:
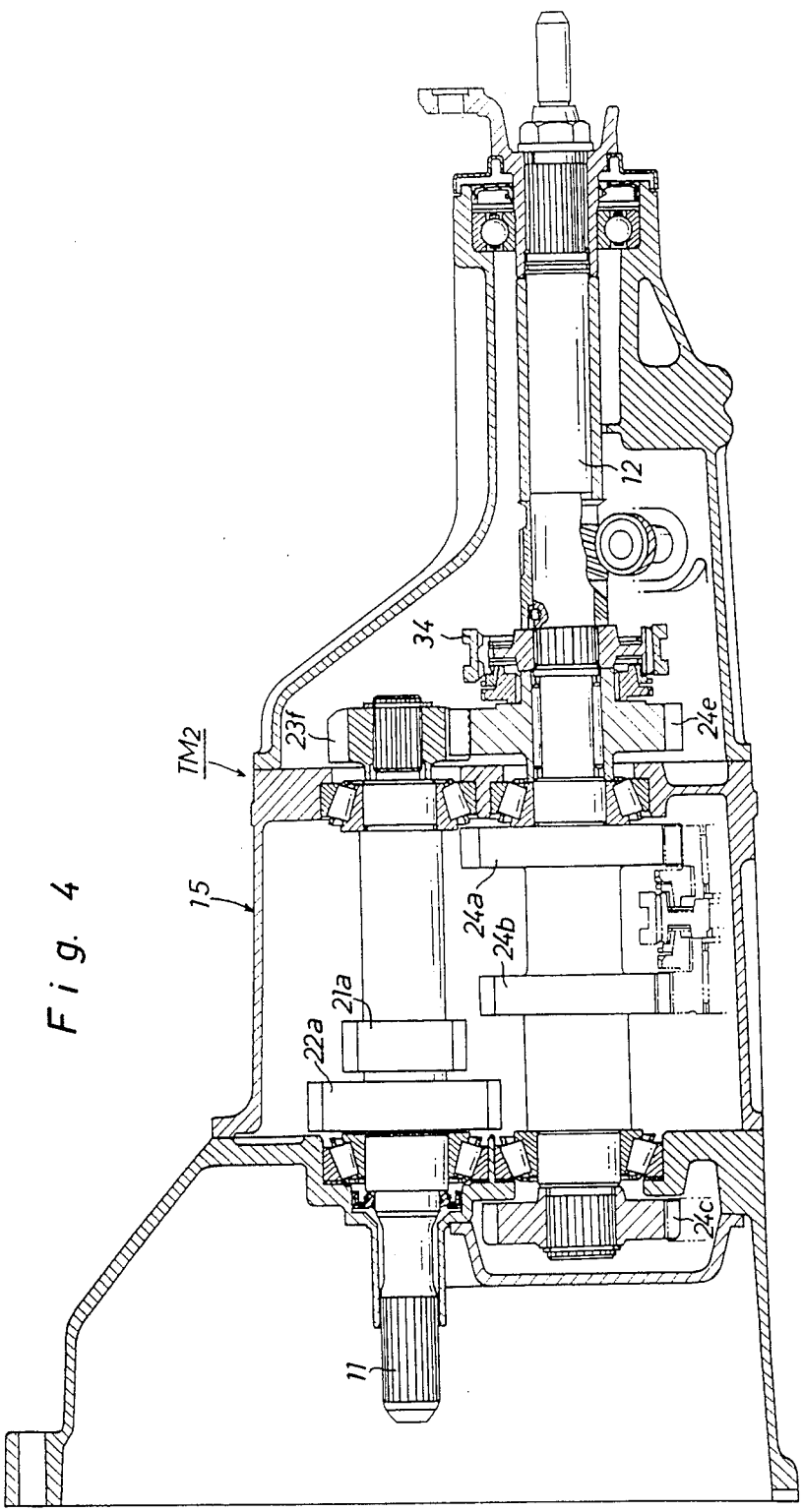
FIG. 4 is a sectioned side view of a modification of the manual transmission which corresponds with the illustration of FIG. 1.

In FIG. 4 there is illustrated a modification of the manual transmission TM$_1$ wherein the reverse driven gear 24d is replaced with a reverse driven gear 24e rotatably mounted on the output shaft 12 and continuously in meshing engagement with the reverse drive gear 23f on the input shaft 12. In the modified transmission TM$_2$, the output shaft 12 has a synchronizer coupling 34 provided thereon to selectively connect the reverse driven gear 24e to the output shaft 12. When connected to the output shaft 12 by the synchronizer coupling 34, the reverse driven gear 24e cooperates with the reverse drive gear 23f to establish a reverse drive train. The other construction and component parts are the same as those in the manual transmission TM$_1$ shown in FIGS. 1–3.

Having now fully set forth the structure and operation of preferred embodiments of the concept underlying the present invention, various other embodiments as well as certain variations and modifications of the embodiments herein shown and described will obviously occur to those skilled in the art upon becoming familiar with said underlying concept. It is to be understood, therefore, that within the scope of appended claims, the invention may be practiced otherwise than as specifically set forth herein.

What is claimed is:

1. A manual transmission for motor vehicles, comprising:

an input shaft having a first drive gear of small diameter for low speed drive and a second drive gear of large diameter for high speed drive fixed thereon;

an output shaft arranged in parallel with said input shaft and having at least a pair of axially spaced change-speed driven gears mounted thereon;

a first countershaft arranged in parallel with said input and output shafts at one side thereof and having a first driven gear fixed thereon and continuously engaged with said first drive gear on said input shaft, a pair of axially spaced low speed drive gears rotatably mounted thereon and continuously engaged with the change-speed driven gears on said output shaft, and a first synchronizer coupling provided thereon to selectively connect said low speed drive gears to said first countershaft; and a second countershaft arranged in parallel with said input and output shafts at the other side thereof and having a second driven gear fixed thereon and continuously engaged with said second drive gear on said input shaft, a pair of axially spaced high speed drive gears rotatably mounted thereon and continuously engaged with the change-speed driven gears on said output shaft, and a second synchronizer coupling provided thereon to selectively connect said high speed drive gears to said second countershaft;

wherein said input shaft has a reverse drive gear fixed thereon and said output shaft has a reverse driven gear axially slidably mounted thereon to be brought into meshing engagement with said reverse drive gear.

2. A manual transmission as claimed in claim 1, wherein said input and output shafts and said countershafts are rotatably mounted within a transmission housing, and wherein said reverse drive gear is fixed on a rear end of said input shaft extending into an extension housing fastened to a rear end of said transmission housing and said reverse driven gear is axially slidably mounted on a portion of said output shaft extending into said extension housing.

3. A manual transmission as claimed in claim 1, wherein said input and output shafts and said countershafts are rotatably mounted within a transmission housing, and wherein said output shaft has an additional change-speed driven gear fixed on a front end thereof extending into a clutch housing fastened to a front end of said transmission housing, and said second countershaft has an additional high speed drive gear rotatably mounted on a front end thereof extending into said clutch housing and continuously engaged with said additional change-speed driven gear and a third synchronizer coupling provided thereon to connect said additional high speed drive gear to said second countershaft.

4. A manual transmission as claimed in claim 1, wherein said output shaft is located under said input shaft and in parallel therewith.

5. A manual transmission as claimed in claim 1, wherein said input and output shafts and said countershafts are rotatably mounted within a transmission housing to contain all said drive and driven gears on said input and output shafts and all said driven and drive gears on said countershafts in said transmission housing.

6. A manual transmission for motor vehicles, comprising:

an input shaft having a first drive gear of small diameter for low speed drive and a second drive gear of large diameter for high speed drive fixed thereon;

an output shaft arranged in parallel with said input shaft and having at least a pair of axially spaced change-speed driven gears mounted thereon;

a first countershaft arranged in parallel with said input and output shafts at one side thereof and having a first driven gear fixed thereon and continuously engaged with said first drive gear on said input shaft, a pair of axially spaced low speed drive gears rotatably mounted thereon and continuously engaged with the change-speed driven gears on said output shaft, and a first synchronizer coupling provided thereon to selectively connect said low speed drive gears to said first countershaft; and a second countershaft arranged in parallel with said input and output shafts at the other side thereof and having a second driven gear fixed thereon and continuously engaged with said second drive gear on said input shaft, a pair of axially spaced high speed drive gears rotatably mounted thereon and continuously engaged with the change-speed driven gears on said output shaft, and a second synchronizer coupling provided thereon to selectively connect said high speed drive gears to said second countershaft;
wherein said input shaft has a reverse drive gear fixed thereon and said output shaft has a reverse driven gear rotatably mounted thereon and continuously engaged with said reverse drive gear on said input shaft and a synchronizer coupling provided thereon to connect said reverse driven gear to said output shaft.

* * * * *